(12) United States Patent
Shepard (10) Patent No.: US 8,738,429 B2
(45) Date of Patent: May 27, 2014

(54) PLATFORM FOR LOYALTY SERVICES (75) Inventor: David Shepard, Novato, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1736 days.

(21) Appl. No.: 11/768,137

(22) Filed: Jun. 25, 2007

(65) Prior Publication Data

US 2008/0319847 A1 Dec. 25, 2008

(51) Int. Cl.
*G06Q 30/00* (2012.01)

(52) U.S. Cl.
USPC ........................................... 705/14.1

(58) Field of Classification Search
None
See application file for complete search history.

(56) References Cited

U.S. PATENT DOCUMENTS

| | | | |
|---|---|---|---|
| 5,970,457 A * | 10/1999 | Brant et al. | 704/275 |
| 2002/0062249 A1* | 5/2002 | Iannacci | 705/14 |
| 2003/0032474 A1* | 2/2003 | Kaminkow | 463/25 |
| 2008/0059302 A1* | 3/2008 | Fordyce, III et al. | 705/14 |

OTHER PUBLICATIONS

Birrell, A.D. et al, Grapvine: An Exercise in Distributed Computing, Apr. 1982.*
Internet Archives WayBack Machine print out of delta.liveonline.net from Jan. 21, 2001.*
Fishwick, Peter. Cutting Edge. Oct. 14, 1994. Marketing Week. vol. 17, Issue 31, and p. 66.*
Fordyce et al., WO #2008027925, Aug. 31, 2006.

* cited by examiner

*Primary Examiner* — Namrata (Pinky) Boveja
*Assistant Examiner* — Thuy N Nguyen
(74) *Attorney, Agent, or Firm* — Kilpatrick Townsend & Stockton LLP (57) ABSTRACT

A platform for a loyalty program provides an interface allowing a consumer to create a benefit tailored for his/her needs. In one embodiment, a consumer accesses the platform via a web-based interface, and selects benefit/reward parameters including but not limited to the nature of the event triggering award of the benefit, the source (i.e. retailer) of the benefit, the nature of the benefit (i.e., discount based upon purchase price or accumulated loyalty points), and/or the events allowing accrual of loyalty points. The interface communicates the inputted parameter to an engine of the loyalty program. The platform would then check the inputted parameter against any constraints, such as parameters of an existing loyalty program in which the consumer is already enrolled.

21 Claims, 7 Drawing Sheets

PLATFORM FOR LOYALTY SERVICES

BACKGROUND

Loyalty programs have emerged as important tools allowing businesses to retain existing customers, and to gain new customers, by offering incentives based upon a volume and/or value of transactions conducted with a particular merchant. Common examples of popular loyalty programs include airline frequent flyer clubs, which allow a consumer to accumulate miles and then allow redemption of those miles for a free trip.

In recent years, loyalty programs have grown in both scope and complexity. For example, more recent types of loyalty programs are not exclusive to a particular product or service (i.e. airline miles), but instead utilize a methodology based upon generic points that may be accumulated based upon a variety of different purchases, for example utilizing a particular financial instrument such as a branded credit or debit card. In certain programs, redemption of accumulated points is not limited to a particular product, but can extend to a catalogue of available products. In other loyalty programs, accumulated points can represent a cash value redeemable for any purchase.

Traditionally, consumers were notified of the status of their participation in a loyalty program as a part of a periodic mailing, for example a monthly credit card billing statement. Telephone call centers were established to allow a user to make more immediate inquiries about their current standing with the loyalty program, and to take steps for redemption for benefits earned.

With the emergence of more complex loyalty programs, software systems have in turn been developed to manage them. Software products responsible for handling loyalty programs have, however, traditionally been confined to single merchants. Such software products manage only the loyalty program associated with that particular merchant location. Different copies of the same software product do not communicate with one another. Very often, these products only capture data at their respective locations and then forward the data to a central location on a periodic basis for merely reporting purposes. Remote access to these products from an external location is typically not provided at all or only on a minimal basis. Moreover, user interfaces for customers are usually nonexistent or lacking user-friendly features. This is because, under conventional practice, customers generally do not interact directly with the software product managing the loyalty program.

With electronic commerce moving onto the Internet, the management of loyalty programs has taken on a more centralized approach. The software product for managing the loyalty program is now generally located on a central server at a single location. Client computers located at merchant locations are used to communicate with the central server to process the desired loyalty transaction via the Internet. Furthermore, a large number of customers are conducting purchase transactions over the Internet, often in the convenience of their own homes or places of work. As a result, functions relating to a loyalty transaction that used to be performed by a store clerk may now need to be handled by the customer himself/herself.

Hence, it would be desirable to provide an interface component that is capable of providing more effective and user-friendly communications with a computerized loyalty program over a computer network.

SUMMARY

A platform for a loyalty program provides a user interface allowing a consumer to create a benefit tailored for his/her needs. In one embodiment, a consumer accesses the platform via a web-based interface, or via a handheld device such as a cell phone or PDA, or via a merchant POS device, and selects benefit parameters including but not limited to the nature of the event triggering award of the benefit, the source (i.e. retailer) of the benefit, the nature of the benefit (i.e., discount based upon purchase price or accumulated loyalty points), and/or the events allowing accrual of loyalty points. The interface communicates the inputted parameter to an engine of the loyalty program. The platform would then check the inputted parameter against any constraints, such as parameters of an existing loyalty program in which the consumer is already enrolled.

An embodiment of a system in accordance with the present invention comprises, a loyalty user interface module comprising a processor and a computer readable storage medium. The computer readable storage medium has code stored thereon to direct the processor to, receive an input from a consumer defining a parameter of a loyalty program; and to communicate the parameter to a loyalty engine in communication with a payment processing network.

An embodiment of a method in accordance with the present invention, comprises, an interface module of a loyalty platform receiving a parameter of a loyalty program input by a consumer; and the interface module communicating the parameter to an engine of the loyalty platform.

These and other embodiments of the invention are described in further detail below.

DETAILED DESCRIPTION

A platform for a loyalty program provides an interface allowing a consumer to create a benefit tailored for his/her needs. In one embodiment, a consumer accesses the platform via a web-based interface, and selects benefit parameters including but not limited to the nature of the event triggering award of the benefit, the source (i.e. retailer) of the benefit, the nature of the benefit (i.e., discount based upon purchase price or accumulated loyalty points), and/or the events allowing accrual of loyalty points. The interface communicates the inputted parameter to an engine of the loyalty program. The platform would then check the inputted parameter against any constraints, such as parameters of an existing loyalty program in which the consumer is already enrolled.

Figure 1:
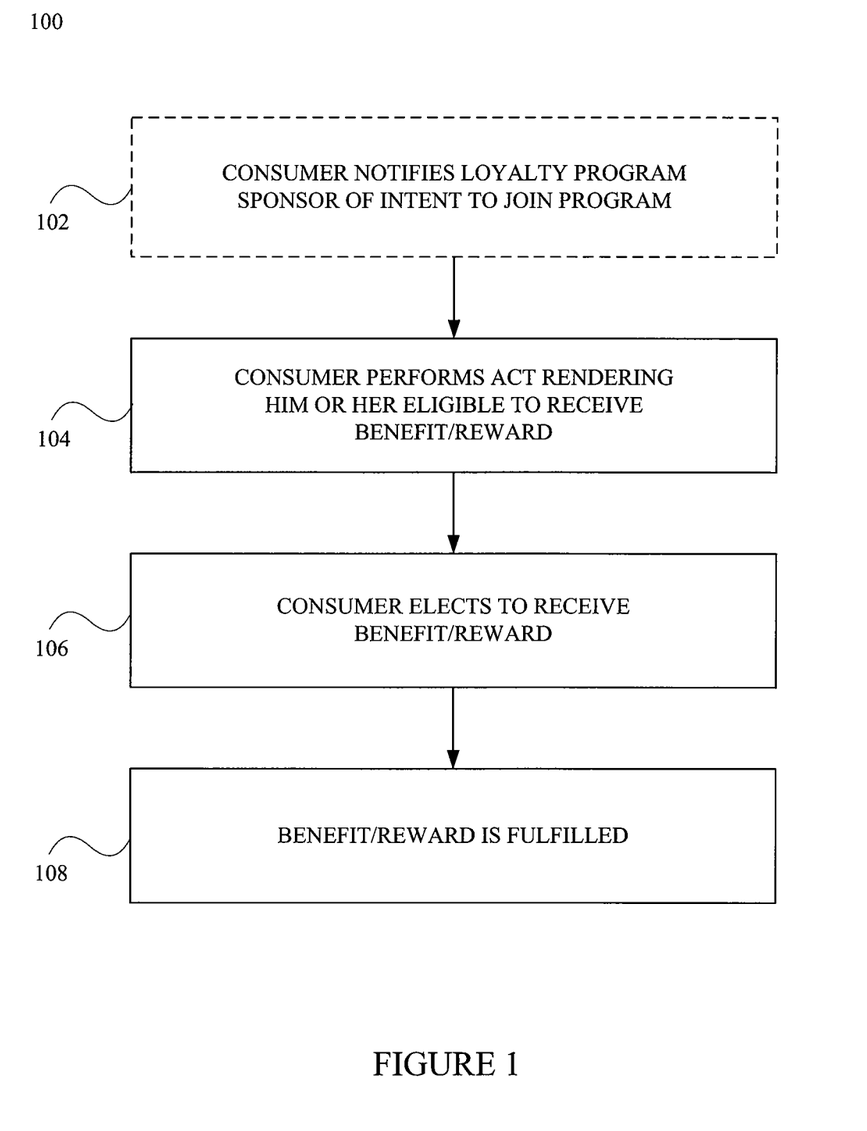
FIG. 1 shows a simplified flow diagram illustrating a series of steps involved in a typical loyalty program.

FIG. 1 shows a simplified diagram illustrating a flow 100 of steps involved in a loyalty program. In an optional first step

102, a consumer actively notifies the loyalty program sponsor of his or her intent to join the program. In this step, the consumer provides certain identifying information, acknowledges the terms and conditions of the loyalty program, and provides unequivocal assent to those conditions. Step 102 is optional, as under certain circumstances a consumer may automatically be enrolled in a loyalty program as a result of previous steps, for example signing up to use a particular credit card.

In a second step 104, the consumer performs an act that renders him or her eligible to receive a benefit or reward provided by the loyalty program. As described in detail below, the act performed by the consumer may take a variety of forms. For example, the consumer may use a particular financial instrument (i.e. credit card) to make a single purchase having a value greater than a threshold amount. Alternatively, the consumer may make a purchase that results in the accumulation of an additional number of points that raises a total number of points beyond a benefit/reward threshold. In still other examples, the consumer may purchase a product that automatically renders him or her eligible for a reward or benefit, regardless of the value of the purchase.

In a third step 106, the consumer may affirmatively elect to receive the benefit or reward for which he/she is eligible. In this redemption step, the consumer notifies the loyalty program of his or her intent to receive the benefit.

In a fourth step 108, the administrator of the loyalty program causes the benefit/reward to be fulfilled. This may be done directly, with the loyalty program administrator forwarding the benefit to the consumer. Alternatively, the loyalty program administrator may contract with a third party to provide the benefit to the consumer.

Figure 2:
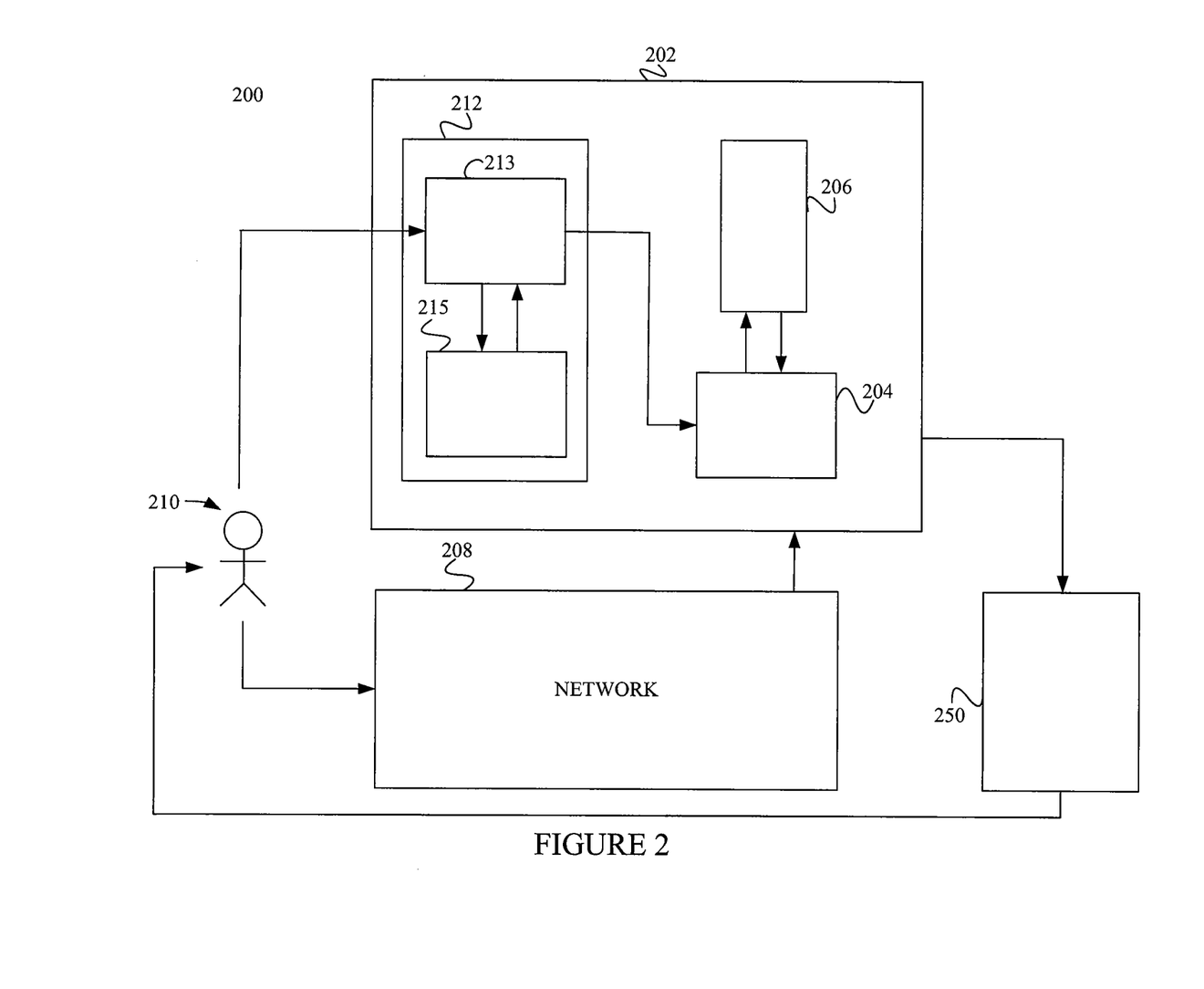
FIG. 2 shows a simplified block diagram of a loyalty system including a loyalty platform in accordance with teachings of the present invention.

FIG. 2 shows a simplified block diagram of an embodiment of a loyalty system including a loyalty platform accordance with an embodiment of the present invention. System 200 includes loyalty platform 202 comprising engine 204 in communication with data storehouse 206 such as a database. Engine 204 is configured to receive information from payment processing network 208 regarding the value and types of purchases being made by a consumer 210. One example of a payment processing network 208 is the VisaNet™ system administered by Visa®. Examples of other types of payment processing networks include those administered by other entities such as DISCOVER®, MASTERCARD®, and AMERICAN EXPRESS®.

As shown in FIG. 2, loyalty platform 202 also includes a user interface module 212. User interface module 212 includes processor 213 in communication with computer readable storage medium 215 having code stored thereon. Code stored in the medium 215 is configured to direct the processor 213 to perform various steps associated with creating and maintaining a loyalty program on the loyalty platform.

For example, user interface module 212 is configured to communicate information regarding the loyalty program to a consumer, and to receive information from the consumer regarding one or more aspects of the loyalty program. Thus user interface module 212 may be configured to receive the personal security information necessary to enroll a consumer in a particular loyalty program.

User interface module 212 may also be configured to receive information from a consumer defining particular parameters of a loyalty program administered by the loyalty platform. In accordance with one embodiment, code stored on the computer readable storage medium of the user interface module may allow a consumer to designate specific characteristics of the event triggering eligibility for a benefit.

For example, a consumer could log onto the loyalty platform and elect to receive a particular benefit based upon a total accumulated number of points. A loyalty program participant could thus access the user interface and elect to participate in a points-based loyalty program wherein accumulation of over a threshold number of points results in eligibility to receive a reward in the form of a particular good or service.

Figure 2A:
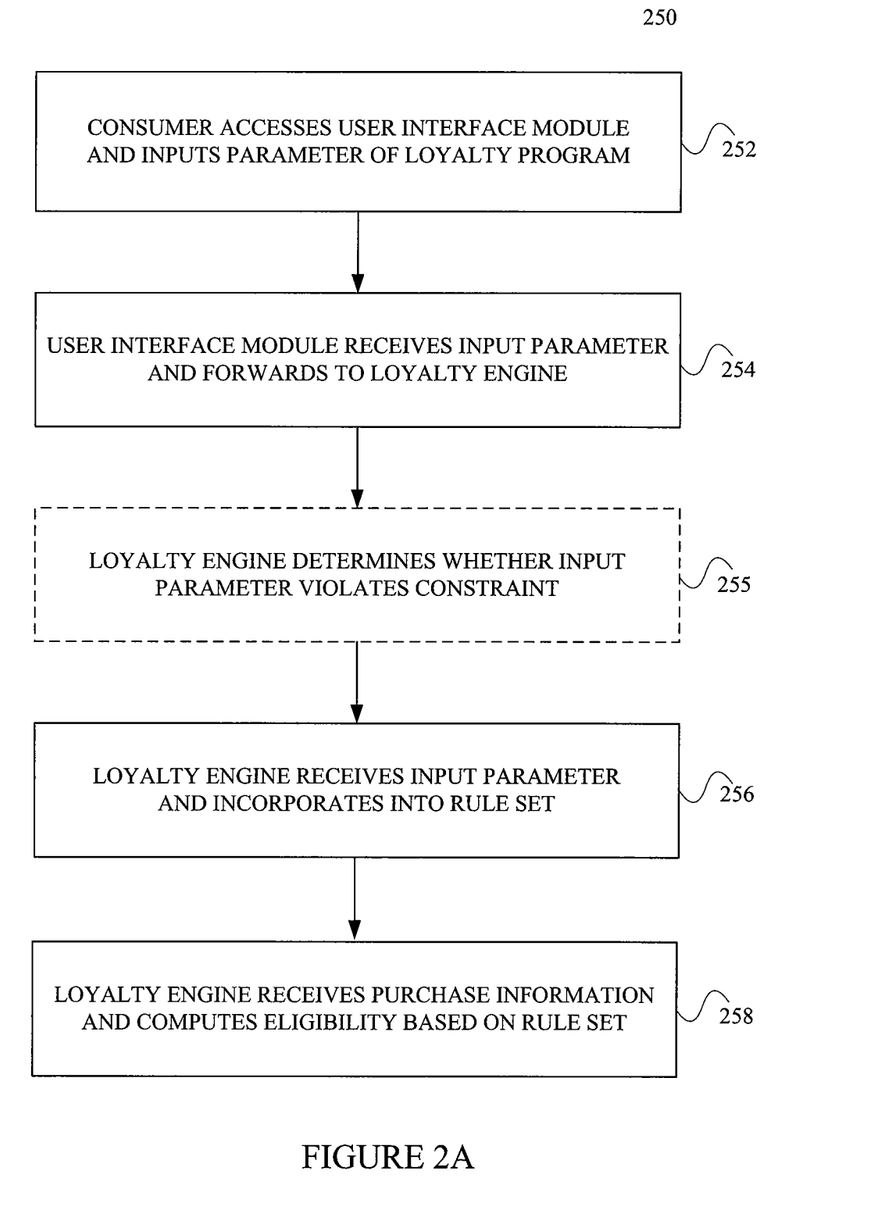
FIG. 2A is a simplified flow diagram showing steps of a method according to teachings of the present invention.

FIG. 2A is a simplified flow diagram showing steps of a method 250 according to teachings of the present invention. In a first step 252, a consumer accesses the user interface module and inputs a parameter of a loyalty program. In a second step 254, the user interface module receives this parameter information and forwards it to the loyalty engine. In a third step 256, the loyalty engine receives the parameter information and incorporates it into a rule set applicable to the particular loyalty program.

In step 258, the loyalty engine 204 receives purchase information of the consumer (or possibly even another individual). Executing operations based upon the stored rule set, the engine determines eligibility of the consumer for one or more benefits/rewards. For example, engine 204 may recognize the value of a particular purchase transaction as exceeding a threshold value. Alternatively, engine 204 may recognize a particular purchase transaction as causing an accumulated value stored in data storehouse 206 for that particular consumer, as exceeding a threshold.

A loyalty platform in accordance with embodiments of the present invention could also be configured to host a plurality of loyalty programs simultaneously for a single consumer. Thus, a loyalty program participant could also access the user interface, and utilizing the processor and code stored on the computer readable storage medium, elect to participate in a different discount-based loyalty program. In one example of such a different loyalty program, the act of purchasing only a particular product, or even a single item, could entitle the consumer to a discount on that or a future product.

One function of the loyalty platform may be to check to see whether or not the parameter input by the user violates any constraints. Accordingly, FIG. 2A includes the optional step 255 of checking to see whether a parameter inputted contravenes any existing limitations on the program features. For instance, the loyalty programs may have other constraints such as the number of points that can be accrued, and/or the number of times a certain award can be earned. In accordance with particular embodiments, the constraints checked for on the loyalty program may be imposed by certain state laws, such as those governing contests or sweepstakes type games.

Other constraints may be imposed by other loyalty programs in which the consumer is already a participant. For example, depending upon conditions of the particular loyalty program as defined in the rule set, a purchase under the discount-based program described above, may or may not also qualify as a reward-eligible purchase under the separate points-based loyalty program.

A consumer may access the user interface of the loyalty platform to control loyalty program parameters other than the nature of the qualifying act. For example, a user may log onto the user interface to determine the identity of the benefit/reward for which he or she is eligible. Thus in accordance with certain embodiments, the user may elect to receive a single, specific benefit, or may select a benefit or a type of benefit from an array of choices such as listed in a catalog. Utilizing the user interface, the user could also determine the particular source of the benefit (i.e. from a particular merchant or manufacturer).

The following provides a nonexclusive listing of examples of parameters of a loyalty program that could be input to a loyalty platform by users through a user interface module according to an embodiment of the present invention:

Loyalty Program Structure
points-based
discount-based
limited time period
limited geographic area
entry into a sweepstakes
qualification for free merchandise or receipt of "gifts"
Eligible Act For Reward/Benefit
Purchase using particular financial instrument (credit/debit/issuer)
Purchase of particular type of good or service
Purchase of particular tem or of a particular manufacturer's product line or at a particular merchant or merchant location, or a group of merchants participating in a particular loyalty program
Nature of instant purchase relative to prior purchase
Purchase in conjunction with coupon
Purchase in during sale or sales event
Purchase during time period, or accumulated purchase count or amount during a time period
Purchase within geographic area
Response to questionnaire or survey
Act by party other than specific customer—householding (employer, family, friends)
Nature of Reward/Benefit
timing (deferred or real time)
specific acts required to redeem
a particular good or service, or type of good or service
a good or service from a catalog or menu
redeem within a particular time period
redeem in a particular geographic area
source (particular merchant or manufacturer)
discount on product purchased or for future product
points representing a cash equivalent?
entry into a sweepstakes As evident from the above description, embodiments in accordance with the present invention allow a consumer to construct a loyalty program with substantially more choice than the conventional reward/coupon offering a single reward based upon a single, specified redemption event. For example, the cardholder could be notified that they qualify for an award and to participate in the reward the cardholder is directed to a website. At the website the cardholder could first choose the event that triggers the benefit. They might be allowed to choose between one or more of the following: choose the store from a list of stores (e.g., TARGET, THE GAP, etc.); choose whether they want a discount based on a set dollar value per a given level of purchase ($10 off any purchase greater than $50), or based on a % of purchase price (10% off purchases over $25). Instead of a discount, the cardholder could elect to receive loyalty points (and again be given choices among different points value business rules) or other benefits. The cardholder could also be given the choice to trigger the benefit based on aggregated purchases or other events ("spend and get"), as opposed to a single event.

Once the participant completes his or her selection of loyalty program parameters using the interface module (in effect, designing a "personalized coupon/reward"), the data storehouse would be updated with the relevant information, for example with card numbers of a relevant financial instrument, and the business rules that the cardholder selected. The engine would then identify the qualifying transactions, and determine benefits eligible for redemption.

Once the nature of the benefit/reward has been determined, the benefit/award is fulfilled by delivery to the consumer. A benefit/award can be fulfilled by the loyalty platform directly, for example by electronically processing a statement credit. Alternatively, as shown in FIG. 2, the benefit/award can be provided to the consumer indirectly utilizing a third party 250 responsible for furnishing the benefit/award to the consumer.

Embodiments in accordance with the present invention may leverage off of existing fields or functionality available to a particular payment processing network, in order to execute the loyalty program. For example, the VisaNet™ payment processing network is configured to include a "reservation file" capability. This capability can be utilized to allow an issuer or other entity to send a file containing individual records that each contain business rules to establish a loyalty offer for individual card numbers. Alternatively, a channel other than VisaNet payment messages can be used to transmit the user selections of rewards parameters to a loyalty platform, with separate file types defined for receiving this information delivered via another, secure channel.

As described in the particular embodiment of FIG. 2, certain embodiments in accordance with the present invention may involve a user interacting with a loyalty platform through an interface module having computer instructions stored at the same remote location as the engine of the loyalty platform. The present invention is, however, not limited to this particular embodiment, however, and alternatives are possible.

Figure 3:
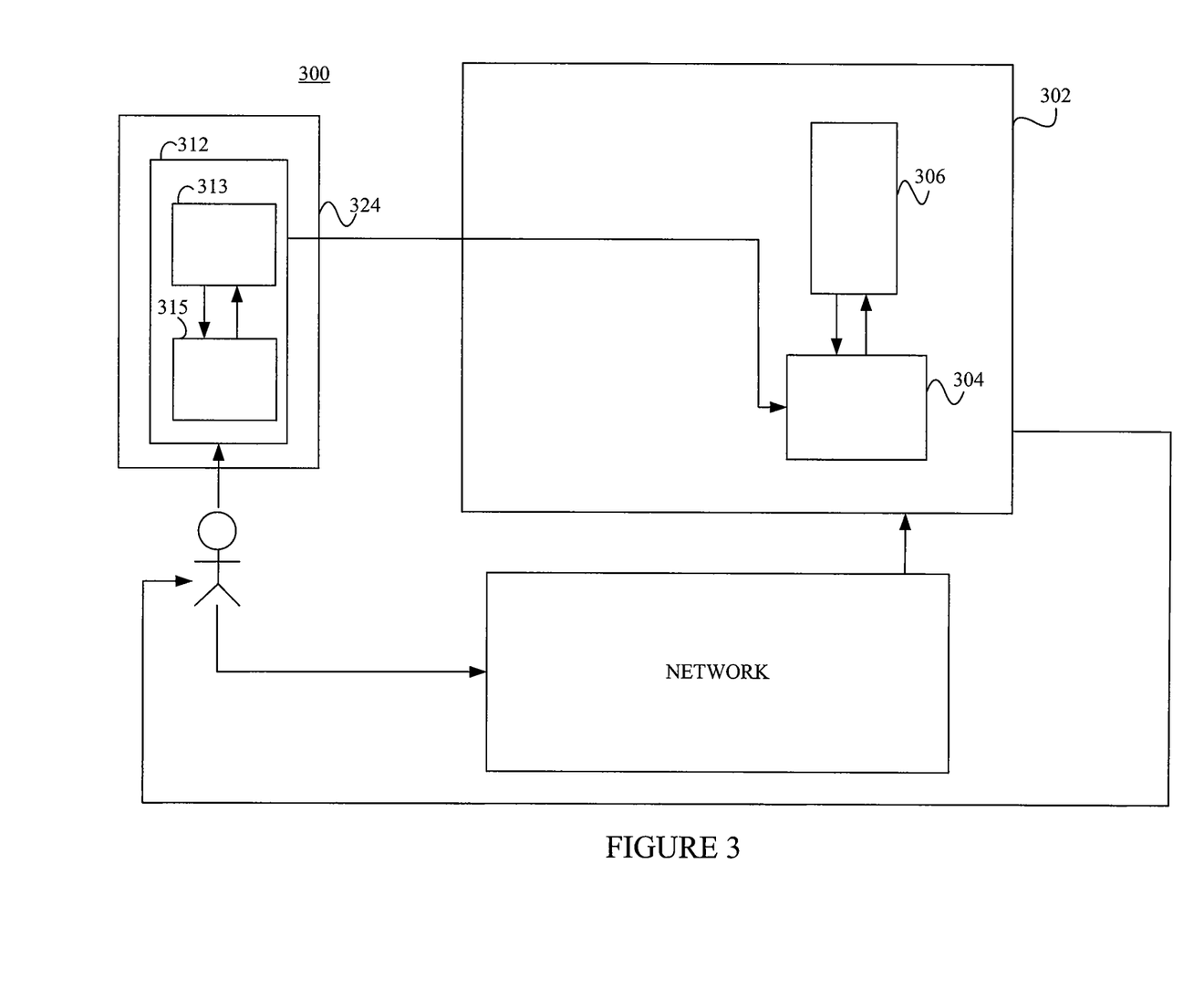
FIG. 3 shows a simplified block diagram of a loyalty system including a loyalty platform in accordance with teachings of the present invention.

For example, FIG. 3 shows an alternative system according to the teachings of the present invention. System 300 is similar to that shown in FIG. 2, except that the user interface module 312 including processor 313 and computer-readable storage medium 315 in communication therewith and having information stored thereon, is located in a consumer device 324 (such as a personal digital assistant (PDA) or desktop or laptop computer), rather than being remotely positioned with the rest of the loyalty platform 302 at the central location of the loyalty engine 304 and data storehouse 306.

In accordance with one such alternative embodiment, loyalty platform 302 may deliver a "personalized coupon" functionality to a user in electronic form. Thus, the loyalty platform may email an applet to the consumer endowing his or her electronic device with the functionality to select parameters of a loyalty program. This would allow parameters of the loyalty program to be determined on a user's mobile device, and communicated to the loyalty engine of the loyalty platform.

Embodiments in accordance with such a "thin client" approach would provide a user interface that allows the user to select a reward based on the parameters that are valid legally and/or under program rules, and also valid from the point of view of the offer that the loyalty program or merchant is willing to make. After the user makes the selections, the applet could convert the selections/parameters into codes in a file layout, that are then sent to the loyalty platform. The loyalty platform would then use the information received to set up the business rules.

In accordance with still another alternative embodiment, the interface module may be present at a merchant location, rather than with the consumer or at the loyalty engine. For example, the loyalty platform may email a software applet to the interface module present at a point-of-sale of a particular merchant.

The above description describes a user to access a loyalty program interface unit over an open computer network, for example the internet, with security ensured by the consumer providing particular identification information. However, embodiments in accordance with the present invention are not limited to providing user with access via the internet. In accordance with other embodiments, a user could interact with the loyalty platform over a closed computer network.

In accordance with still other embodiments, a user could interact with the loyalty platform through a telephone network. Such embodiments could utilize audio inputs and oral feedback communicated over the telephone to the input module. The input module could employ consumer selection of menus from a numeric keypad and voice inputs to communicate information.

Figure 4:
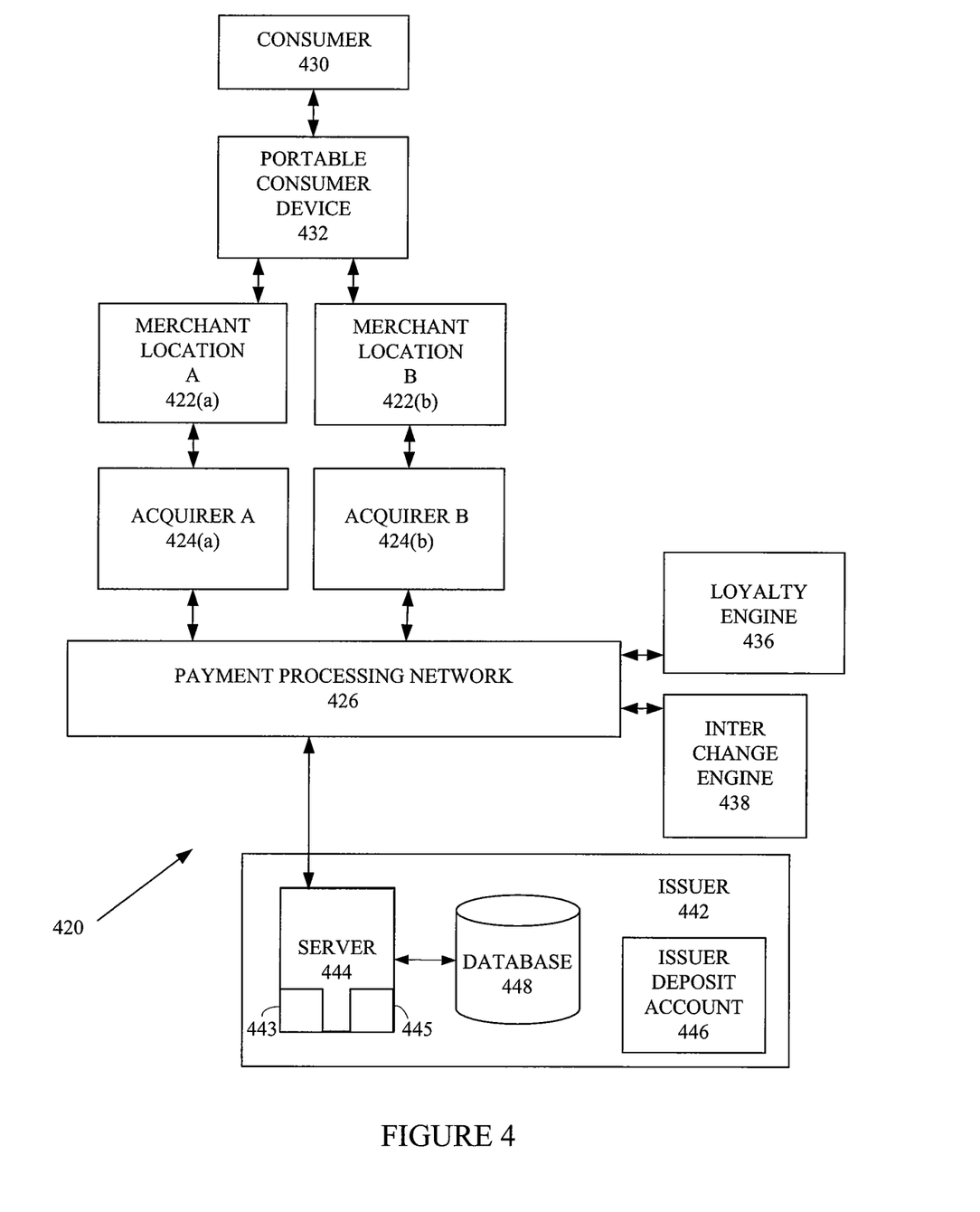
FIG. 4 shows a simplified block diagram of an electronic commerce system with which the loyalty platform may be integrated.

FIG. 4 is a simplified block diagram of the overall electronic commerce system 400 to which a loyalty platform according to the teachings of the present invention could be integrated. Electronic commerce system 400 includes merchant locations 422(*a*), 422(*b*) and acquirers 424(*a*), 424(*b*) associated with those merchant locations 422(*a*), 422(*b*).

The different merchant locations 422(*a*), 422(*b*) may be affiliated with a single merchant, or may embody different merchants. The different merchant locations 422(*a*), 442(*b*) may represent the actual physical location of the merchants themselves, or the origin of a purchase transaction on behalf of the merchant (i.e. a call center or centralized internet node). The different merchant locations could also represent merchants that participate in a particular loyalty program, and who may or may not be accessed via a loyalty portal.

A consumer 430 may purchase goods or services at the merchant locations 422(*a*), 422(*b*) using a portable consumer device 432. The acquirers 424(*a*), 424(*b*) can communicate with an issuer or issuer processor 442 via a payment processing network 426.

The portable consumer devices 432 according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer device can also be virtual, in the form of an account number known to the consumer. The portable consumer devices 432 can also be debit devices (e.g., a debit card), credit devices (e.g., a credit card), or stored value devices (e.g., a stored value card). In some embodiments, the portable consumer devices 432 may be re-writeable so that values associated with the portable consumer devices 432 are stored on them. In other embodiments, the values associated with the portable consumer devices may be stored at a server operated by or at an issuer or processor of an issuer.

The payment processing network 426 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base 11 system which performs clearing and settlement services. Settlement can alternatively be accomplished utilizing single messaging service (SMS).

The payment processing network 426 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing network 426 may use any suitable wired or wireless network, including the Internet.

The merchant locations 422(*a*), 422(*b*) also have electronic terminals (not shown), such as point of sale (POS) terminals, that can interact with the portable consumer devices 432. The POS terminals could also be sent the applets, or have the functionality to enable the user selections built in. Any suitable electronic terminal may be used, including magnetic stripe or contactless card readers. The card readers may include any suitable contact or contactless mode of operation. For example, exemplary card readers can include RF (radio frequency) antennas, magnetic stripe readers, etc. to interact with the portable consumer devices 432.

Two software engines are shown in communication with the payment processing network in the particular embodiment of FIG. 4. These software engines include a loyalty engine 436 and an interchange engine 438.

Embodiments of the loyalty engine 436 have been described above. The loyalty engine may be configured according to embodiments of the present invention to generate specific benefits/rewards for the consumer. Such rewards may include discounts on specific purchases of specific products or at specific merchants.

The interchange engine 338 may be used to calculate interchange fees or perform other interchange related functions. The interchange engine is not required by all embodiments of the present invention. Moreover, various other software engines may also be included in the payment processing network to perform the methods according to embodiments of the invention. Such software engines can be accessible to the issuer or issuer processor 428, the payment processing network 426, or the acquirers 424(*a*), 424(*b*). Although the two software engines 436, 438 are shown as being directly accessible to the payment processing network 426, one or both may also or alternatively be directly accessible to the acquirers 424(*a*), 424(*b*) or the issuer 442.

The interchange engine 438 may perform interchange processing (as described above). The loyalty engine 436 may contain or store the various loyalty or incentive programs operated or initiated by the merchant or the issuer. As described above, the loyalty engine 436 may operate at the instruction of computer code for storing a rule set and executing that rule set to generate benefits/rewards based upon consumer actions.

The engines 436, 438 and any other software components or functions described in the instant patent application, may be implemented as software code to be executed by a processor using any suitable computer language such as, for example, Java, C++ or Perl using, for example, conventional or object-oriented techniques. For example, any of the specific steps (or combination of steps) shown in the previous figures may be embodied as computer code on a computer readable medium in any suitable combination. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

As shown in FIG. 4, the issuer 442 may include an issuer deposit account 446. The issuer 442 may further include a host computer or server 444 including a computer readable storage medium 443 and a processor 445. The server 444 is in electronic communication with a database 448 configured to store information pertaining to a financial account of a consumer.

Figure 5:
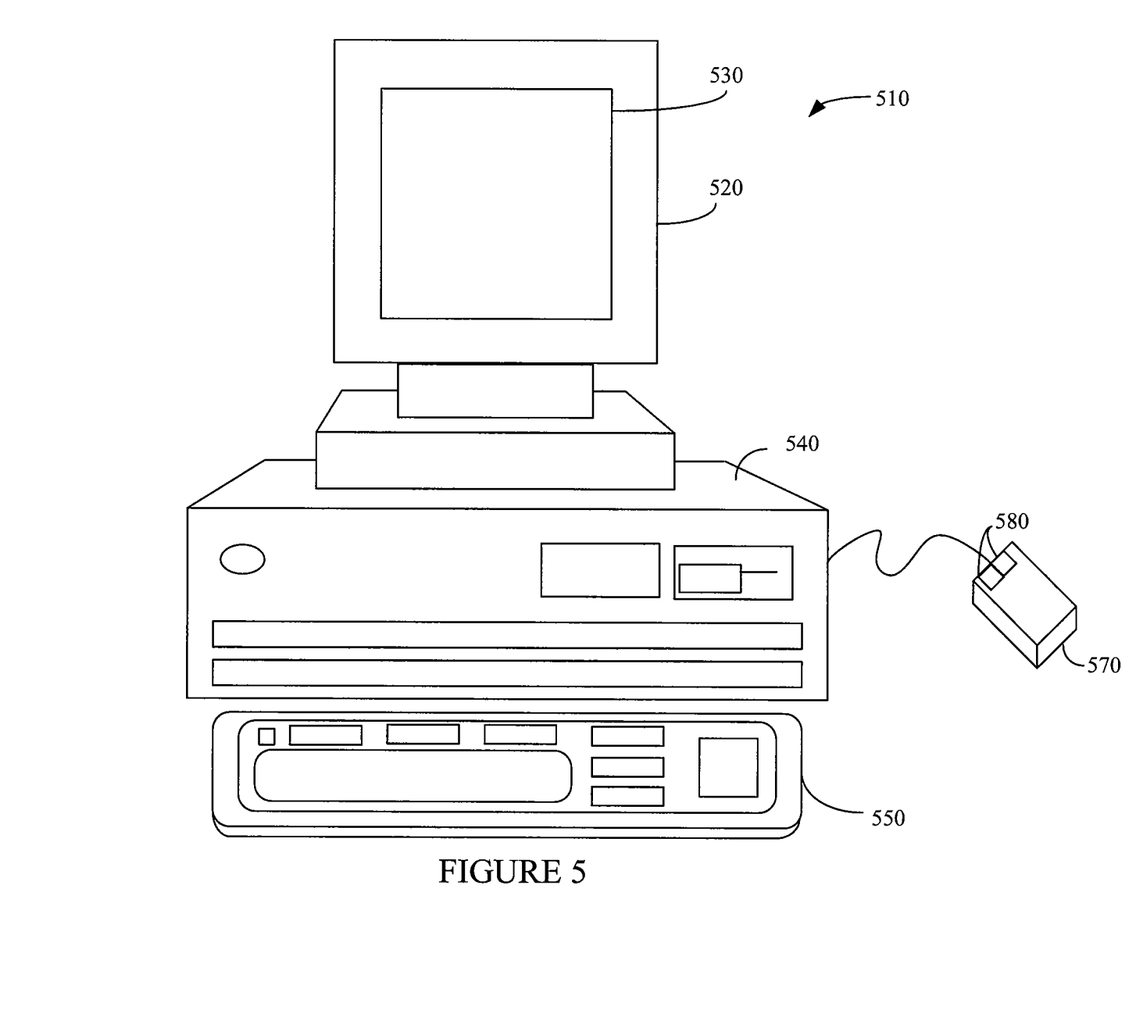
FIG. 5 is a simplified generic diagram of a computer system configured to perform various functions according to the teachings of the present invention.

A computer system configured to perform various functions of the loyalty system according to the teachings of the present invention (e.g. functioning as the loyalty engine and/or the interface module) is represented generically in the drawing of FIG. 5. Specifically, FIG. 5 shows computer system 510 including display device 520, display screen 530, cabinet 540, keyboard 550, and mouse 570.

Mouse 570 and keyboard 550 are representative "user input devices." Mouse 570 includes buttons 580 for selection of buttons on a graphical user interface device. Other examples of user input devices are a touch screen, light pen, track ball, data glove, microphone, and so forth. FIG. 5 is representative of but one type of system for embodying the present invention. It will be readily apparent to one of ordinary skill in the art that many system types and configurations are suitable for use in conjunction with the present invention. In one embodiment, computer system 510 includes a Pentium class based computer, running Windows NT operating system by Microsoft Corporation. However, the apparatus is easily adapted to other operating systems and architectures by those of ordinary skill in the art without departing from the scope of the present invention.

As noted, mouse 570 can have one or more buttons such as buttons 580. Cabinet 540 houses familiar computer components such as disk drives, a processor, storage device, etc. Storage devices include, but are not limited to, disk drives, magnetic tape, solid state memory, bubble memory, etc. Cabinet 540 can include additional hardware such as input/output (I/O) interface cards for connecting computer system 510 to external devices external storage, other computers or additional peripherals, further described below.

Figure 5A:
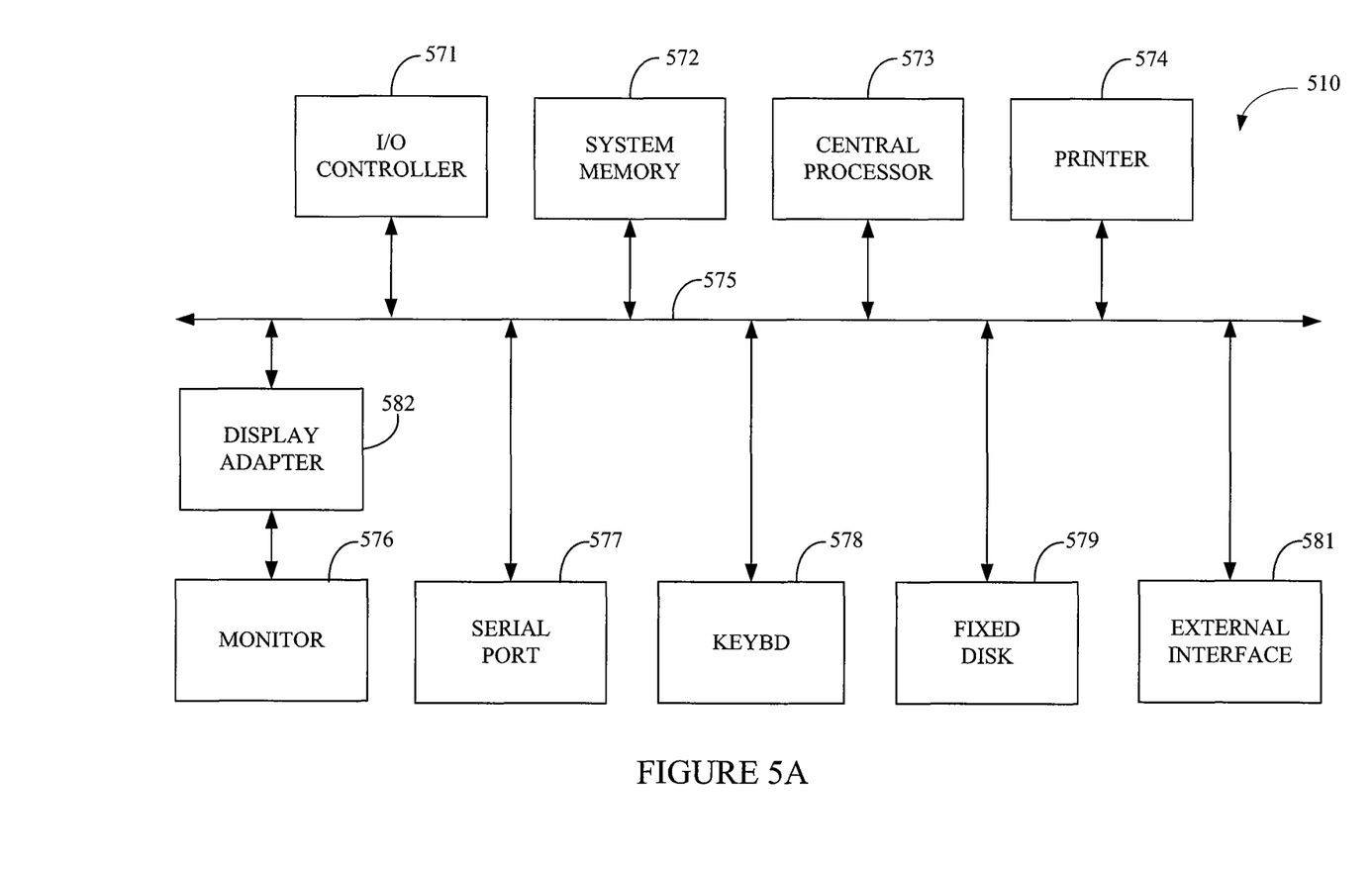
FIG. 5A is an illustration of basic subsystems of the computer system of FIG. 5.

FIG. 5A is an illustration of basic subsystems in computer system 510 of FIG. 5. This diagram is merely an illustration and should not limit the scope of the claims herein. One of ordinary skill in the art will recognize other variations, modifications, and alternatives. In certain embodiments, the subsystems are interconnected via a system bus 575. Additional subsystems such as a printer 574, keyboard 578, fixed disk 579, monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 can be used to connect the computer system to a modem 581, which in turn connects to a wide area network such as the Internet, a mouse input device, or a scanner. The interconnection via system bus allows central processor 673 to communicate with each subsystem and to control the execution of instructions from system memory 572 or the fixed disk 579, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A system comprising:
   a loyalty user interface module in communication with a group of merchants and comprising a processor and a computer readable storage medium having code stored thereon to direct the processor to,
   receive an input from a consumer defining a first parameter of a loyalty program, the first parameter comprising a choice of a structure of the loyalty program;
   receive an input from the consumer defining a second parameter of the loyalty program, the second parameter comprising a choice of a reward qualifying act;
   receive an input from the consumer defining a third parameter of the loyalty program, the third parameter comprising a choice of a nature of a reward; and
   communicate the first, second, and third parameters to a loyalty engine in communication with a payment processing network, wherein the loyalty engine stores the first, second, and third parameters in a data storehouse remotely positioned from the group of merchants.

2. The system of claim 1 wherein the loyalty user interface module is located remote from the consumer and is configured to receive the inputs over a computer network.

3. The system of claim 2 wherein the loyalty user interface module is located with the loyalty engine.

4. The system of claim 2 wherein the loyalty user interface module is located with a merchant.

5. The system of claim 1 wherein the loyalty user interface module is located in a device of the consumer.

6. The system of claim 1 wherein the computer readable storage medium further comprises a second code configured to determine whether at least one of the parameters violates a constraint.

7. A system comprising:
   a loyalty user interface module comprising a processor and a computer readable storage medium having code stored thereon to direct the processor to,
   receive an input from a consumer defining a parameter of a loyalty program, and
   communicate the parameter to a loyalty engine in communication with a payment processing network; and
   wherein the computer readable storage medium further comprises a second code configured to determine whether the parameter violates a constraint, and further wherein the constraint comprises whether the parameter conflicts with a second parameter of another loyalty program.

8. The system of claim 1 wherein the first parameter relating to structure of the loyalty program is selected from a points-based structure of the loyalty program, a discount-based structure of the loyalty program, a time-limited structure of the loyalty program, entry into a sweepstakes program, qualification for a receipt of free merchandise or gifts, or a geographic limited structure of the loyalty program.

9. The system of claim 1 wherein the second parameter relating to a nature of a reward qualifying act is selected from an act during a limited time period, an act in a limited geographic area, a purchase utilizing a particular financial instrument, a purchase of particular type of good or service, a purchase of particular of good or service, a character of an instant purchase relative to a prior purchase, a purchase in conjunction with a coupon, a purchase in conjunction with a sales event, accumulation of a certain amount of purchases or points during a time period, a response to questionnaire/survey, and an act by party other than specific customer.

10. The system of claim 1 wherein the third parameter relating to a nature of a reward is selected from a timing of fulfillment of the reward, a specific act required for redemption, a particular good/service or type of good/service comprising the reward, entry into a sweepstakes, redemption of the reward from a catalog or menu, redemption of the reward within a particular time period or geographic area, a source of the reward, or whether the reward is a discount on product purchased or for future product.

11. A method comprising:
an interface module of a loyalty platform receiving a plurality of parameters of a loyalty program input by a consumer, the plurality of parameters including a choice of a structure of the loyalty program, a choice of a reward qualifying act, and a choice of a nature of a reward; and
the interface module communicating the plurality of parameters to an engine of the loyalty platform, wherein the engine of the loyalty platform is in communication with a group of merchants, further wherein the engine of the loyalty platform stores the plurality of parameters in a data storehouse remotely positioned from the group of merchants.

12. The method of claim 11 wherein the interface module receives the plurality of parameters from the consumer over a computer network.

13. The method of claim 12 wherein the interface module receives the plurality of parameters over an internet.

14. The method of claim 11 wherein the interface module receives the plurality of parameters as a verbal input from the consumer.

15. The method of claim 11 further comprising the engine determining whether a parameter in the plurality of parameters violates a constraint.

16. The method of claim 15 wherein the constraint comprises whether the parameter conflicts with a second parameter of another loyalty program.

17. The method of claim 11 wherein a parameter in the plurality of parameters relating to structure of the loyalty program is selected from a points-based structure of the loyalty program, a discount-based structure of the loyalty program, a time-limited structure of the loyalty program, entry into a sweepstakes program, qualification for a receipt of free merchandise or gifts, or a geographic limited structure of the loyalty program.

18. The method of claim 11 wherein a parameter in the plurality of parameters relating to a nature of a reward qualifying act is selected from an act during a limited time period, an act in a limited geographic area, a purchase utilizing a particular financial instrument, a purchase of particular type of good or service, accumulation of points or a purchase amount over a time period, a purchase of particular of good or service, a character of an instant purchase relative to a prior purchase, a purchase in conjunction with a coupon, a purchase in conjunction with a sales event, a response to questionnaire/survey, and an act by party other than specific customer.

19. The method of claim 11 wherein a parameter in the plurality of parameters relating to a nature of a reward is selected from a timing of fulfillment of the reward, a specific act required for redemption, entry into a sweepstakes, a particular good/service or type of good/service comprising the reward, redemption of the reward from a catalog or menu, redemption of the reward within a particular time period or geographic area, a source of the reward, or whether the reward is a discount on product purchased or for future product.

20. The system of claim 6 wherein the constraint comprises a number of times a certain award can be earned.

21. The method of claim 11 wherein the loyalty program is a discount-based program, the method further comprising receiving a plurality of parameters of a points-based loyalty program from the consumer.

* * * * *